(12) United States Patent
Hartanto

(10) Patent No.: US 10,041,525 B2
(45) Date of Patent: Aug. 7, 2018

(54) PIN ASSEMBLY

(71) Applicant: AIRBUS OPERATIONS LIMITED, Bristol (GB)

(72) Inventor: Boedy Hartanto, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 110 days.

(21) Appl. No.: 15/176,539

(22) Filed: Jun. 8, 2016

(65) Prior Publication Data
US 2016/0363155 A1 Dec. 15, 2016

(30) Foreign Application Priority Data

Jun. 9, 2015 (GB) .................................. 1509988.0

(51) Int. Cl.
*F16B 39/04* (2006.01)
*F16B 39/06* (2006.01)
*F16B 39/08* (2006.01)

(52) U.S. Cl.
CPC .............. *F16B 39/06* (2013.01); *F16B 39/04* (2013.01); *F16B 39/08* (2013.01)

(58) Field of Classification Search
CPC .......... F16B 39/01; F16B 39/04; F16B 39/06; F16B 39/08
USPC .................................................. 411/315, 321
See application file for complete search history.

(56) References Cited

U.S. PATENT DOCUMENTS

| | | | | |
|---|---|---|---|---|
| 109,681 | A | * | 11/1870 | Smith ..................... F16B 39/04 403/360 |
| 566,050 | A | * | 8/1896 | Woodward .............. F16B 39/04 269/90 |
| 933,420 | A | * | 9/1909 | Conradi et al. ......... F16B 39/04 2/271 |
| 1,016,237 | A | * | 1/1912 | Tinnin .................... F16B 39/08 411/197 |

(Continued)

FOREIGN PATENT DOCUMENTS

| | | |
|---|---|---|
| EP | 0402198 A1 | 12/1990 |
| GB | 267725 A | 3/1927 |

(Continued)

OTHER PUBLICATIONS

European Search Report dated Oct. 26, 2016 EP Application No. EP 16173452.

*Primary Examiner* — Roberta S Delisle
(74) *Attorney, Agent, or Firm* — Nixon & Vanderhye P.C.

(57) ABSTRACT

The invention provides a pin assembly comprising a pin having a screw threaded portion, a nut having a screw threaded portion, wherein, preferably, the pin has a number of pin recesses and the nut has a splined portion having a number of splines, the assembly further comprising a sleeve having a splined portion having a number of splines and a number of sleeve recesses, and a cross-member for insertion through at least one pin recess, and at least one sleeve recess, such that once assembled, rotation of the nut about the pin axis is restricted by the combination of the mating of the sleeve splined portion with the splined portion of the nut and the insertion of the cross-member through the sleeve recess and pin recess. The invention also provides a fixing assembly, landing gear actuation mechanism, aircraft, method of manufacturing and a kit of parts.

27 Claims, 4 Drawing Sheets

(56) References Cited

U.S. PATENT DOCUMENTS

| | | | | |
|---|---|---|---|---|
| 1,099,510 A * | 6/1914 | O'Connor | ............... | F16B 39/04 411/320 |
| 1,105,606 A * | 8/1914 | Beach | ..................... | F16B 39/04 411/320 |
| 1,126,847 A * | 2/1915 | Pardini | ................... | F16B 39/04 184/48.1 |
| 1,128,748 A * | 2/1915 | Boren | ..................... | F16B 39/04 411/315 |
| 1,134,596 A * | 4/1915 | Dillon | ..................... | F16B 39/06 411/321 |
| 1,438,312 A * | 12/1922 | Kerwin | ................... | F16B 39/04 411/315 |
| 1,787,114 A * | 12/1930 | Lelean | ..................... | F16B 39/08 411/213 |
| 1,891,358 A * | 12/1932 | Pickop | ..................... | F16B 39/08 411/265 |
| 2,365,433 A | 12/1944 | Polizzi | | |
| 2,407,928 A | 9/1946 | Herreshoff et al. | | |
| 3,179,141 A * | 4/1965 | Folmar | ................... | F16B 39/04 411/293 |
| 5,080,544 A | 1/1992 | Bruyere | | |
| 5,685,681 A * | 11/1997 | Smith, II | ................ | F16B 39/04 411/294 |
| 8,113,754 B2 * | 2/2012 | Dahl | ....................... | F16B 39/02 411/120 |
| 2010/0080666 A1 | 4/2010 | Dahl et al. | | |
| 2012/0224934 A1* | 9/2012 | Chang | ..................... | B60B 3/16 411/315 |
| 2013/0149068 A1* | 6/2013 | Jackson | .................. | F16B 39/04 411/315 |
| 2013/0209194 A1 | 8/2013 | Kratzer et al. | | |

FOREIGN PATENT DOCUMENTS

| | | |
|---|---|---|
| GB | 2176560 A | 12/1986 |
| JP | S5388657 U | 7/1978 |
| JP | S6023617 A | 2/1985 |
| JP | 2006250230 A | 9/2006 |
| WO | 2011057337 A1 | 5/2011 |

* cited by examiner

PIN ASSEMBLY

RELATED APPLICATIONS

The present application claims priority from Great Britain Application Number 1509988.0, filed Jun. 9, 2015, the disclosure of which is hereby incorporated by reference herein in its entirety.

BACKGROUND OF THE INVENTION

The present disclosure relates to a pin assembly.

The present invention concerns the field of fixings, and particularly, but not exclusively, fixings for aircraft. More particularly, but not exclusively, this invention concerns a pin assembly comprising a pin for supporting a rotating part, the pin defining a pin axis, and a nut, defining a nut axis and having a screw threaded portion which mates with the screw threaded portion of the pin.

The invention also concerns a fixing assembly, landing gear actuation mechanism, aircraft, method of manufacturing and a kit of parts.

A first prior art pin assembly for an aircraft comprises a pin, onto which a nut is screw threaded. The nut is screwed onto the pin to a required torque. Once this torque level has been applied and the nut is in that orientation, a hole is drilled through the pin and nut at the same time. This hole is used for a cross-bolt, so that the nut is secured to the pin at that torque level.

There are a number of problems with this arrangement. Firstly, the pin and nut are not interchangeable—in other words, if you want to replace the nut, you have to replace the pin as well and vice versa. Another problem is that there are a lot of stages to achieving this assembly and can make aircraft assembly more time consuming and expensive. Also, even if this method is carried out, it still can lead to misalignment between the pin and nut holes so that the cross-bolt cannot be used.

In a second prior art pin assembly, the locking nut comprises locking "castellations" on its outer end. A locking ring, with corresponding castellations, is placed around the pin to mate with the nut. The locking ring also has internal splines which mate with splines on the pin. Once the locking ring is fitted, bolts parallel to the pin axis are used to secure the locking ring to the locking nut. The ration of the number of holes in the locking ring and locking nut to the number of splines on the locking ring and pin is 1:3.

There are also problems with this arrangement. For example, the torque the nut is to be screwed onto the pin to cannot be accurately controlled as the nut has to end up in an orientation that allows the locking nut to mate with it whilst also mating with the pin splines. Hence, often, the locking nut is slightly looser or tighter than is ideal.

A third pin assembly arrangement comprises a pin with splines on it. A spline collar is placed on these pin splines to act as a washer. The pin also comprises a threaded portion outside of the splines and a nut is screwed onto this thread of the pin. The nut comprises recesses on its outer end. These recesses are like divets in the edge of the nut and have a width slightly larger than the diameter of a cross-bolt. Once the nut is thread onto the pin, the cross bolt is used to go through a pair of the divets and also through a corresponding pair of holes in the pin.

This arrangement also suffers from the problem that the orientation (and therefore torque level) of the nut on the pin cannot be accurately controlled. This is because the nut has to end up in an orientation that allows the nut divets to line up with the pin holes. Hence, often, the nut is slightly looser or tighter than is ideal.

The present invention seeks to mitigate the above-mentioned problems. Alternatively or additionally, the present invention seeks to provide an improved pin of fixing assembly.

SUMMARY OF THE INVENTION

The present invention provides, according to a first aspect, a pin assembly comprising a pin for supporting a rotating part, the pin defining a pin axis and having a screw threaded portion, a nut, defining a nut axis, and having a screw threaded portion which mates with the screw threaded portion of the pin, wherein either the pin has a number of pin recesses arranged around the pin axis and the nut has a splined portion having a number of splines at least partially aligned with the nut axis, or the nut has a number of nut recesses arranged around the nut axis and the pin has a splined portion having a number of splines at least partially aligned with the pin axis, a sleeve, defining a sleeve axis, and having a splined portion for mating with the splined portion of the nut or pin, the splined portion having a number of splines, each spline at least partially aligned with the sleeve axis, and a number of sleeve recesses arranged around the sleeve axis for corresponding to the pin or nut recesses, and a cross-member for insertion through at least one pin or nut recess and at least one sleeve recess, such that once assembled, rotation of the nut about the pin axis is restricted by the combination of the mating of the sleeve splined portion with the nut or pin splined portion and the insertion of the cross-member through the sleeve recess and pin or nut recess.

Such an arrangement allows the nut to be secured for a required torque level/orientation by the sleeve and pin. In other words, for any required level of torque/orientation of the nut and pin, the recesses of the sleeve can be aligned with the pin/nut recesses.

This arrangement is novel over the first prior art example, at least because it includes a splined sleeve, that the pin/nut (also splined) can mate with. The sleeve also has a number of sleeve recesses. This means that the nut can be secured at a required torque without the need to later drill a hole though the pin and nut.

This arrangement is novel over the second prior art example, at least because it requires a cross-member for insertion through at least one pin or nut recess and at least one sleeve recess.

This arrangement is novel over the third prior art example, at least because it includes a splined sleeve, that the pin/nut (also splined) can mate with, the sleeve also having a number of sleeve recesses. This means that the nut/yin can be secured to the sleeve via the recesses.

In some embodiments, the nut has a number of nut recesses arranged around the nut axis and the pin has a splined portion having a number of splines at least partially aligned with the pin axis. In these embodiments, the mating of the splined sleeve with the splined pin restricts rotation of the sleeve about the pin axis. Also, the cross-member through at least one nut recess and at least one sleeve recess restricts rotation of the nut in relation to the sleeve, and therefore, in relation to the pin.

However, preferably, the pin has a number of pin recesses arranged around the pin axis and the nut has a splined portion having a number of splines at least partially with the nut axis. Hence, once assembled, rotation of the nut about the in axis (in relation to the sleeve) is restricted by the splined portion of the nut engaging with the splined portion of the sleeve, and the rotation of the sleeve about the pin axis is restricted by the cross-member engaging with both said at least one pin recess and said at least one sleeve recess.

The recesses may be indents in the pin/nut or sleeve, such that a cross-member can interact with both a pin/nut recess and a sleeve recess to restrict relative movement of the two parts relative to each other (i.e. about the pin/nut or sleeve axis). The recesses may extend fully or partially through a wall in the pin/nut or sleeve or the width of the pin/nut or sleeve. The recesses may comprise holes in the pin/nut or sleeve or they may comprise a "cut-out" in an edge of the pin/nut or sleeve (effectively a hole overlapping the edge of the part so as to be open-sided).

Preferably, the cross-member is a cross-bolt and may be associated with a washer, securing nut and/or a cotter pin to secure the cross-member in place.

Preferably, a portion of the pin where the pin recesses are located is hollow. The pin recesses may extend through a wall of the pin so as to extend to the hollow area.

Preferably, the screw threaded portion of the pin is located towards a first end of the pin and wherein the pin recesses are located towards a second, opposite end of the pin. This allows the nut to be screwed onto the pin prior to the sleeve being put on the pin.

Preferably, the screw threaded portion of the pin has a first diameter and wherein the pin recesses portion of the pin has a second diameter, the second diameter being smaller than the first diameter.

Preferably, the pin/nut recesses or sleeve recesses extend all the way through walls of the pin/nut or sleeve.

Preferably, the screw threaded portion of the nut is located towards a first end of the nut and wherein the splined portion is located towards a second, opposite end of the nut.

Preferably, the nut splines are arranged such that the ends of the splines facing the second end are exposed. This enables the nut splines to mate with splines of the sleeve.

Preferably, the splined portion of the sleeve is located towards a first end of the sleeve and wherein the sleeve recesses are located towards a second, opposite end of the sleeve. This enables the sleeve splines to mate with splines of the nut/pin.

More preferably, the sleeve splines are arranged such that the ends of the splines facing the first end are exposed.

Preferably, the number of pin/nut recesses is the same as the number of sleeve recesses. This number may be less than 9. The number may be greater than 7. Most preferably, this number is 6.

Preferably, the pin/nut recesses or sleeve recesses are arranged equiangularly about the axis of the pin/nut or sleeve.

Preferably, the number of pin/nut and sleeve recesses is an even number, such that each pin/nut or sleeve recess has a corresponding paired recess on the opposite side of the pin/nut or sleeve.

Preferably, the number of nut/pin splines is the same as the number of sleeve splines. This number may be greater than 15. More preferably, this number may be greater than 20. This number may be higher than the number of pin/nut recesses or spline recesses.

Preferably, the nut/pin spline sleeve splines are arranged equiangularly about the axis of the nut/pin or sleeve.

Preferably, the number of recesses is not a factor of the number of splines.

This means that, for a given orientation of the sleeve splines with the nut/pin splines (i.e. one orientation out of a number of possible orientations, each orientation corresponding to a different sleeve spline mating with a given nut/pin spline), the alignment of a given pin/nut recess with a closest spline recess is different to the alignment of a different pin/nut recess with its closest sleeve recess. In other words, for a given spline mating orientation, the recesses line up to different degrees. Therefore, for a given spline orientation, there is a pin/nut recess and closest sleeve recess that align better than any other pin/nut recess and closest sleeve recess. Also, the spline orientation can be chosen in order to achieve the best alignment of any one of the pin/nut recesses and its closest sleeve recess, for a given pin/nut orientation/torque level.

In other words, the torque level can be chosen to be whatever is required and then, the spline orientation can be chosen to give a well aligned pin/nut recess and closest sleeve recess that allows the cross-member to be inserted through the recesses.

More preferably, the number of splines and the number of recesses have no common factors greater than 2. This means that the variation in alignment of the different recesses is greater, thereby giving mater alignment for any one of the pin/nut recesses and its closest sleeve recess, for a larger number of pin/nut orientations/torque levels.

Most preferably, the number of splines and the number of recesses have no common factors other than 1. This means that the variation in alignment of the different recesses is greatest.

According to a second aspect of the invention there is also provided a fixing assembly comprising an elongate part (for example a pin, bolt or the like) defining an axis and having a screw threaded portion, a nut secured to the elongate part by means of a screw threaded portion of the nut mating with the screw threaded portion of the first elongate part, and a sleeve fitted in a manner which restricts rotation of the nut relative to the elongate part, wherein the fixing assembly is so arranged that rotation of the sleeve relative to the elongate part is restricted by means of an interaction between one or more formations of a first type (for example a part defining a recess or hole) of the sleeve and one or more formations of the elongate part (for example a part defining a recess or hole, such that a bolt may pass through the recesses/holes, when aligned, of sleeve and elongate part); and rotation of the sleeve relative to the nut being restricted by means of an interaction between one or more formations of a second type (for example one or more splines) of the sleeve and one or more formations of the nut (for example one or more splines, which mate with the splines of the sleeve); and the fixing assembly is so arranged that, with the nut secured to the elongate part (e.g. fully screwed on, e.g. to a given pre-set toque), the sleeve may be positioned in a first rotational position in which the formations of the sleeve one of the first and second type are aligned with corresponding formations on the elongate part/nut, and a first formation of the sleeve of the other of the first and second type is more closely aligned with a second corresponding formation on the elongate part/nut, than in any other rotational position, and a second rotational position in which the formations of the sleeve of one of the first and second type are aligned with corresponding formations on the elongate part/nut, and the first formation of the sleeve of the other of the first and second type is both more closely aligned with a third corresponding formation on the elongate part/nut than in any other rotational position and more closely aligned with the third corresponding formation than the alignment of the first formation with the second corresponding formation when in the first rotational position.

According to a third aspect of the invention there is also provided a landing gear actuation mechanism comprising the pin or fixing assembly as described above.

According to a fourth aspect of the invention there is also provided an aircraft comprising the pin r fixing assembly or landing gear actuation mechanism as described above.

According to a fifth aspect of the invention there is also provided a method of assembling the pin assembly or fixing assembly as described above.

According to a sixth aspect of the invention there is also provided a method of assembling the pin assembly, comprising the steps of mating the screw threaded portion of the nut to the screw threaded portion of the pin and tightening to a desired torque, mating the splines of the sleeve to the splines of the nut/pin, such that one of the sleeve recesses aligns with one of the pin/nut recesses as closely as possible, and inserting the cross-member through the chosen pin/nut and sleeve recesses.

Preferably, the step of mating the splines of the sleeve to the splines of the nut/pin comprises judging the best orientation of the sleeve relative to the nut/pin to minimise misalignment between any one of the pin/nut recesses and any one of the sleeve recesses.

Preferably, the steps are carried out in the order listed.

According to a seventh aspect of the invention there is also provided a kit of parts for assembling the pin assembly or fixing assembly as described above, the kit of parts comprising the pin/elongate part, the nut, the sleeve, and, optionally, the cross-member.

It will of course be appreciated that features described in relation to one aspect of the present invention (e.g. the pin assembly or fixing assembly) may be it corporated into other aspects (e.g. the fixing assembly or pin assembly) of the present invention. As another example, the method of the invention may incorporate any of the features described with reference to the apparatus of the invention and vice versa.

DESCRIPTION OF THE DRAWINGS

Embodiments of the present invention now be described by way of example only with reference to the accompanying schematic drawings of which.

DETAILED DESCRIPTION

Figure 1A:
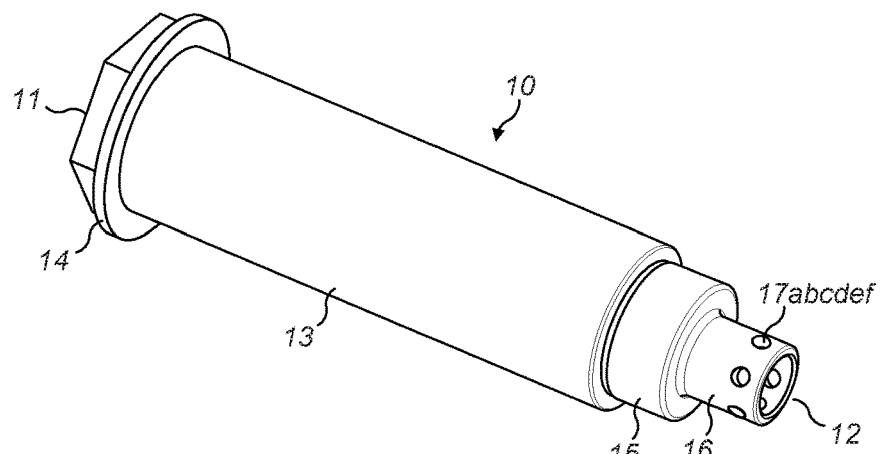
FIG. 1a shows a perspective view of a pin, which is part of a pin assembly according to a first embodiment of the invention.

FIG. 1a shows a perspective view of a pin 10, which is part of a pin assembly 100 according to a first embodiment of the invention. The pin 10 has a first end 11 and second end 12. Most of the length of the pin 10 comprises a main shaft portion 13. Towards the first end 11 of the pin 10 is a flange 14. This flange 14 prevents a rotating part (not shown) on the main shaft 13 from sliding off the first end 11 of the pin 10.

Towards the second end 12 of the pin 10 is an externally threaded portion 15, having a smaller diameter than the main shaft 13. Beyond that portion 15, further towards the second end 12 of the pin 10, is a hollow portion 16 with an even smaller diameter than the threaded portion 15. This hollow portion 16 has a circular wall with a hollow area inside. On the hollow portion 16 are six holes 17 (17 a, b, c, d, e, f) spaced equi-angularly around the hollow portion 116. Hence, the holes are spaced out by an angle of 60 degrees between each hole.

Figure 1B:
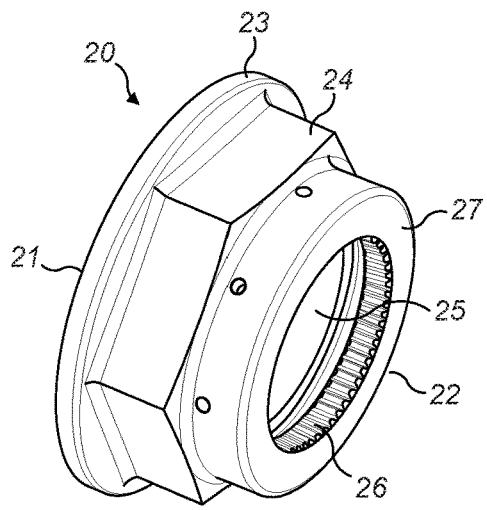
FIG. 1b shows a perspective view of a nut, which is also part of the pin assembly.

FIG. 1b shows a perspective view of a nut 20, which is also part of the pin assembly 100. The nut 20 has a first end 21 and second end 22. The nut 20 is in the form of a ring so it can be placed over the second end 12 of the pin 10. Towards the first end 21 of the nut 20 is a flange 23. This flange 23 prevents a rotating part (not shown) on the main shaft 13 of the pin 10 from sliding off the second end 12 of the pin 10.

Towards a middle portion of the nut 20 is an internally threaded portion 25. This threaded portion 25 corresponds to the threaded portion 15 of the pin 10. Hence, when the nut 20 is placed over the second end 112 of the pin 10, it can be screwed in place to a required torque level. Also towards the middle portion of the nut 20 is an external hexagonal profile shape 24 to allow the nut 20 to be screwed on the pin 10 to the desired torque level.

Towards the second end 22 of the nut 20 is an overhang portion 27 provided with internal involute splines 26. There are 85 of the splines, arranged equi-angularly around the circumference (i.e. an angle spacing of 4.235 degrees between splines). The overhang portion 27 places the splines at a location further towards the central axis of the nut 20. In other words, the splines 26 are located inwards of the internal threaded portion 25. This provides a "thread-spline" clearance 28, which can be seen in FIG. 3.

Figure 1C:
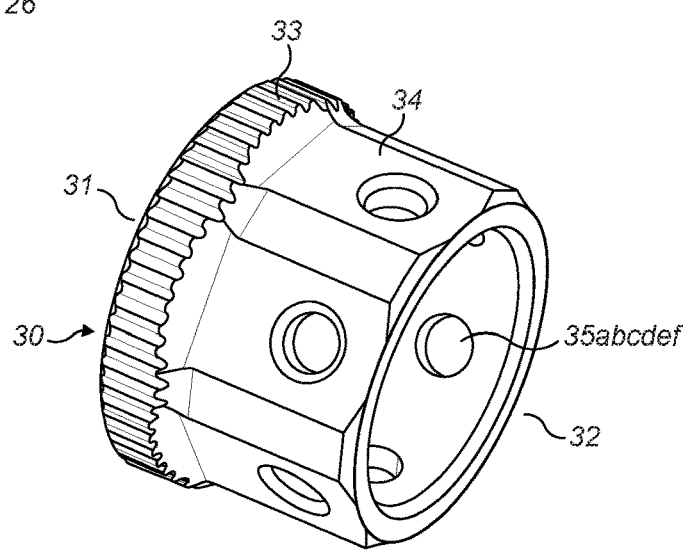
FIG. 1c shows a perspective view of a sleeve, which is also part of the pin assembly.

FIG. 1c shows a perspective view of a sleeve 30, which is also part of the pin assembly 100. The sleeve 30 has a first end 31 and second end 32. The sleeve 30 is in the form of a ring so it can be placed over the second end 12 of the pin 10 to secure the nut 20 in the given orientation (with respect to the pin) for its required torque level.

Towards the first end 31 of the sleeve is a splined portion provided with external involute splines 33. There are 85 of the splines, arranged equi-angularly around the circumference (i.e. an angle spacing of 4.235 degrees between splines). The external diameter of this splined portion corresponds to the internal diameter of the splined portion 26 of the nut 20 so that the splines of the sleeve 33 and the splines of the nut 26 can mate together.

Towards the second end 32 of the sleeve 30 is hexagonally externally shaped portion 34, with each face of the hexagonal shape provided with a chamfered hole 35 to give six holes in total (35 a, b, c, d, e, f). These six holes 35 are spaced equi-angularly around the hexagonally shaped portion 34. Hence, the holes 35 are spaced out by an angle of 60 degrees between each hole. The internal diameter of the hexagonally shaped portion 34 corresponds to the external diameter of the hollow portion 16 of the pin 10, so that the sleeve 30 can slide onto (and have a snug fit with) the second end 12 of the pin 10.

Figure 2:
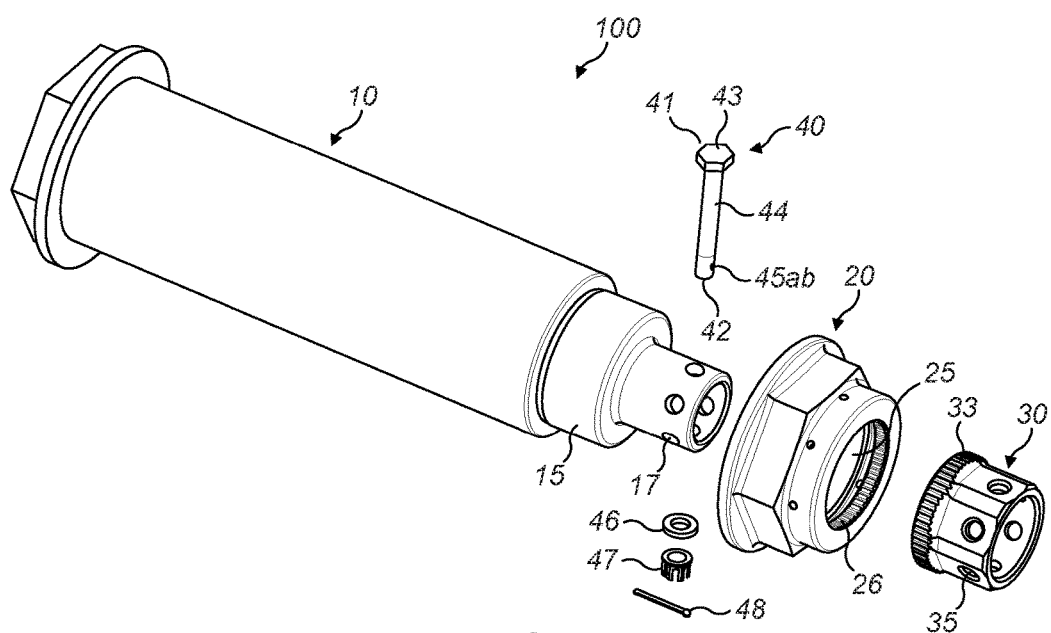
FIG. 2 shows an exploded perspective view of the pin assembly.

FIG. 2 shows an exploded perspective view of the pin assembly 100. The pin assembly 100 is assembled so that the axes of the pin, nut and sleeve are aligned, with the nut 20 screwed onto the pin 10 and the sleeve slid on the pin 10 so that the splines 33 of the pin mate with the splines 26 of the nut 20. The axis of the whole assembly (which corresponds to the axes of the pin, nut and sleeve) is shown by axis line 50 in FIG. 3.

FIG. 2 also shows across-bolt 40 and associated parts. The cross-bolt 40 comprises a bolt head 43 (chamfered on its underside) at its first end 41, a main shaft 44 and a pair of opposite holes 45a and 45b through the main shaft towards the second end 42. Associated with the cross-bolt is a washer 46 for placing over the second end 42 once the cross-bolt has been inserted through the pin and sleeve holes 17, 35. Also, with the cross-bolt is a securing nut 47 for placing on after the washer 46 and a cotter pin for extending through the holes 45 a and 45b to secure the securing nut and washer in place.

Figure 3:
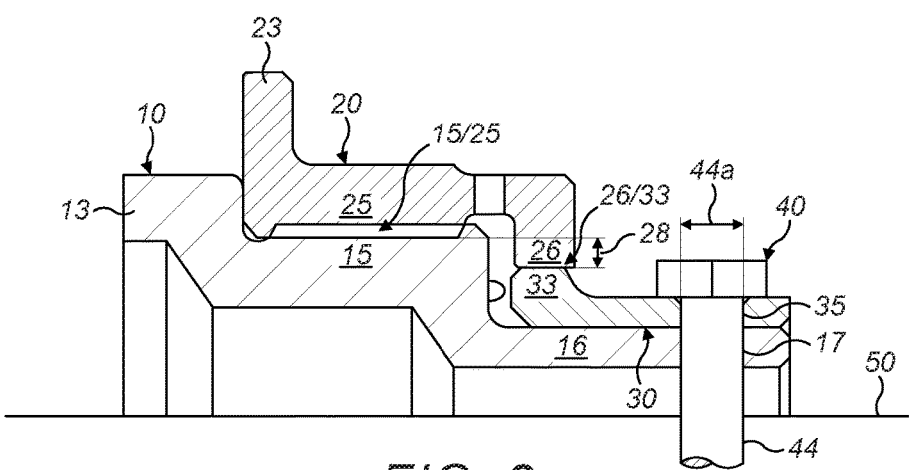
FIG. 3 shows a cress-sectional side view of one half of the assembled pin assembly.

FIG. 3 shows a cross-sectional side view of one half of the assembled pin assembly 100. Here, it can be seen that the threaded portions 15 and 25 of the pin and nut form a threaded interface 15/25 and the splines of the nut 26 and sleeve form a splined interface 26/33. The cross-bolt 40 can be seen extending through one of the pin holes 17 and one of the sleeve holes 35. The chamfer of the bolt head 43 sits in the corresponding chamfer of the sleeve hole 35 and the bolt head sits on the flat side of the sleeve 30. On the opposite side (not shown in FIG. 3), the cross bolt 40 will extend through the opposite pin hole and sleeve hole on the other side of the pin and sleeve to the first holes and is then secured by washer 46, nut 47 and cotter pin 48 against the opposite flat side of the sleeve.

Figure 4A:
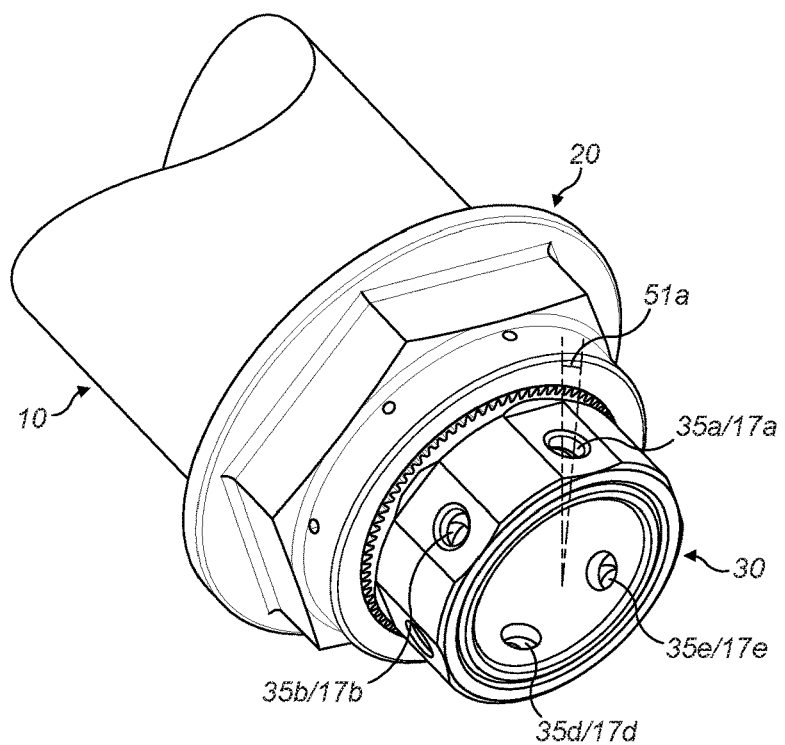
FIG. 4a shows a perspective view of an end of the pin assembly with the sleeve in a first orientation on the nut.

FIG. 4a shows a perspective view of an end of the pin assembly 100 with the sleeve 30 in a first orientation on the nut 20. Here, the sleeve 30 is orientated so that the angle deviation between hole 35a of the sleeve and hole 17a of the p deviation of a little over 6 degrees (6.101 degrees, shown by angle 51a). It can also be seen that holes 35b and 17b (and also opposite holes 35e and 17e) also do not align very well.

Figure 4B:
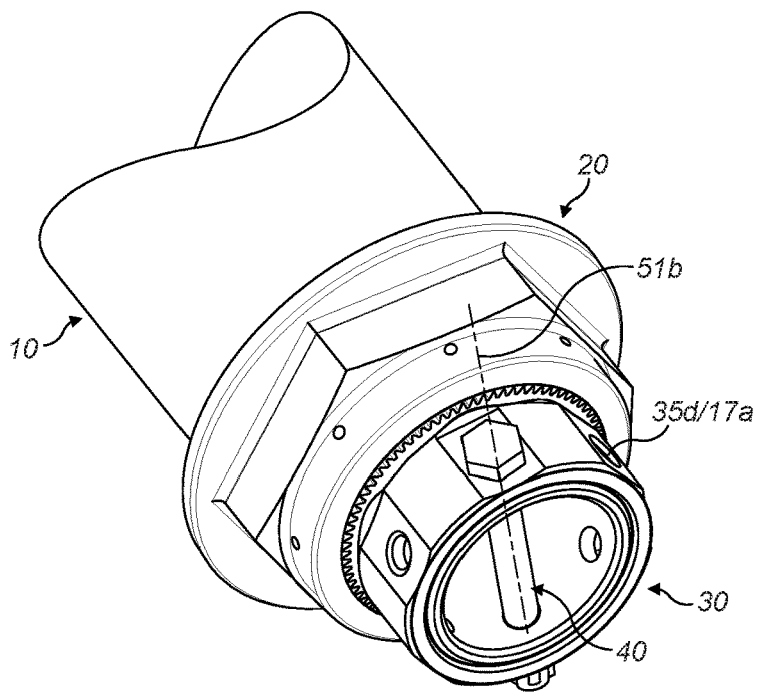
FIG. 4b shows a perspective view of the end of the pin assembly with the sleeve in a second orientation on the nut.

FIG. 4b shows a perspective view of the end of the pin assembly 100 with the sleeve 30 in a second orientation on the nut 20. From FIG. 4a, the sleeve 30 has been removed and rotated to a different orientation so that different splines of the splined portions 33, 26 mate with each other and slid back on (as described in more detail later). Here, holes 35a and 17a align with a deviation of less than 0.3 degrees (shown by angle 51b). These holes (and also opposite holes 35d and 17d) align well enough for the cross-bolt 40 to be inserted through the holes.

By having the number of splines as 85 and the number of holes as 6, this allows for the 85 different orientations of the sleeve relative to the nut to give a variation in the amount of alignment/deviation between holes. For each of these orientations, a given sleeve hole will align differently to a given pin hole. Also, in each orientation, each sleeve hole and corresponding pin hole will align to different degrees to other sleeve and corresponding pin holes.

What is also important to note is that in a given orientation certain sleeve hole may be the closest aligned sleeve hole to any pin hole (out of all the sleeve holes) but in an adjacent or similar orientation, a different sleeve hole may then be the closest aligned sleeve hole to any pin hole.

To illustrate this, if the splines of the nut were numbered 1 to 85 and the splines of e sleeve numbered 1 to 85, the spline could be placed in any one of 85 orientations with respect to the nut. These 85 orientations correspond to when sleeve spline 1 being slid on nut spline 1, sleeve spline 2 being slid on nut spline 1 or sleeve spline 3 being slid on nut spline 1 . . . etc . . . . Let us call the orientation in FIG. 4a orientation 1 (where sleeve spline 1 is slid on nut spline 1). Here, the pin hole 17a is near sleeve hole 35a but not aligned. In fact, it is misaligned by 6.101 degrees. By rotating the sleeve by 4.235 degrees (i.e. by one spline) orientation 2, the alignment deviation hole 35a and 17a) would be reduced to 1.866 degrees (6.101 degrees minus 4.235 degrees). That is the minimum deviation of the two holes. This is because the deviation can only change from that by a minimum of ±4.235 degrees (i.e. one spline).

However, if the adjacent sleeve hole 35b is used to align with pin hole 17a, the minimum angle deviation is less. By rotating by 14 splines (by an angle of 59.294 degrees) into orientation 16, the angle deviation of sleeve hole 35b and pin hole 17a is only 1.156 degrees. Again, that is the minimum deviation of the two holes because the deviation can only change from that by ±4.235 degrees. The minimum deviation is different from above because the sleeve is rotated by 59.294 degrees (rather than 60 degrees, which would mean the same deviation with pin hole 17a as sleeve hole 35a). I.e. there is a difference of 0.706 degrees.

If the sleeve 30 is then rotated again by another 14 splines (by another 59.294 degrees) into orientation 30, sleeve hole 35c aligns with pin hole 17a with an angle deviation of 0.446 degrees (the previous deviation of 1.156 minus 0.706 degrees=0.446 degrees). Further, if the sleeve 30 is then rotated again by another 14 splines (by another 59.294 degrees) into orientation 44, sleeve hole 35d aligns with pin hole 17a with an angle deviation of 0.264 degrees (the previous deviation of 0.446 minus 0.706 degrees=−0.264). This is the orientation shown in FIG. 4b. This small misalignment (as calculated as a negative) is in the opposite direction than the misalignment of FIG. 4a.

If the sleeve 30 was then rotated past the orientation in FIG. 4b by another 14 orientations (into orientation 58), the minimum angle deviation (between sleeve hole 35e and pin hole 17a) would change by another 0.706 degrees to 0.446 degrees (the previous deviation of −0.264 degrees plus 0.706 degrees=0.446 degrees). This is larger than for orientation 44 and the same as for orientation 30. Similarly, for orientation 72, the minimum angle deviation (between sleeve hole 35f and pin hole 17a) would change by another 0.706 degrees to 1.156 degrees. This is also larger than for orientation 44 and the same as orientation 16.

For each rotation of the sleeve by 14 orientations, the sleeve holes rotate by 59.294 degrees. Therefore, after that rotation, some sleeve holes will be nearer a closest pin hole than before and others will be farthest away. However, the orientation of the sleeve can be chosen in order to minimising the deviation.

For any torque level, when choosing the combination of pin/sleeve hole and sleeve orientation to minimise the angle deviation of the sleeve and pin holes, the maximum angle deviation is only 0.353 degrees. This maximum angle deviation value is found, for spline/holes numbers with no common factors, by dividing the pitch angle of each spline (360 degrees divided by 85=4.235 degrees) by the number of holes (6) and then dividing by 2 (as the sleeve hole can have a deviation either side of each pin hole).

For a pin/sleeve diameter of 52 mm, this gives a maximum diameter deviation of 0.32 mm. For a required clearance of 0.05 mm and a required bolt diameter of 7.925 mm, this gives a required hole diameter (of the holes in the sleeve and pin) to be 8.3 mm (7.925+0.05+0.32 mm).

Figure 5:
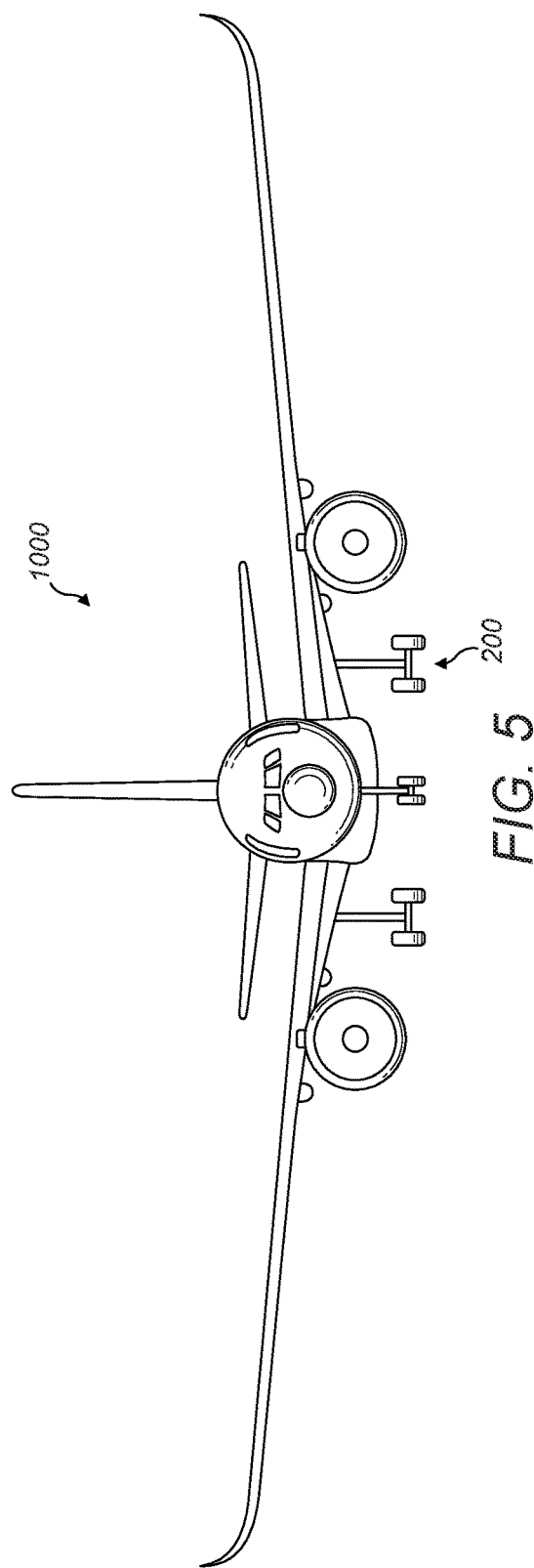
FIG. 5 shows a front view of an aircraft, including landing gear, using the pin assembly.

FIG. 5 shows a front view of an aircraft 1000, including landing gear 200. The landing gear 200 includes the pin assembly 100.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The holes may be on the nut instead of the pin and the splines may be on the pin instead of the nut. This still allows a similar "minimising of the angle deviation" arrangement to be possible.

The number of holes and splines may be any chosen numbers. However, the arrangement works better the lower the largest common factor of the two numbers.

The holes may be replaced with divets, cut-outs, non-through holes or any other kind of suitable recess.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A pin assembly comprising;
   a pin for supporting a rotating part, the pin defining a pin axis and having a screw threaded portion,
   a nut, defining a nut axis, and having a screw threaded portion which mates with the screw threaded portion of the pin,
   wherein either:
   i) the pin has a number of pin recesses arranged around the pin axis and the nut has a splined portion having a number of splines at least partially aligned with the nut axis, or
   ii) the nut has a number of nut recesses arranged around the nut axis and the pin has a splined portion having a number of splines at least partially aligned with the pin axis,
   a sleeve, defining a sleeve axis, and having a splined portion for mating with the splined portion of the nut or pin, the splined portion having a number of splines, each spline at least partially aligned with the sleeve axis, and a number of sleeve recesses arranged around the sleeve axis for corresponding to the pin or nut recesses, and
   a cross-member for insertion through at least one pin or nut recess and at least one sleeve recess,
   such that once assembled, rotation of the nut about the pin axis is restricted by the combination of the mating of the sleeve splined portion with the nut or pin splined portion and the insertion of the cross-member through the sleeve recess and pin or nut recess, wherein the number of nut/pin splines is equal to the number of sleeve splines, and the number of recesses is not a factor of the number of splines.

2. A pin assembly as claimed in claim 1, wherein the pin has a number of pin recesses arranged around the pin axis and the nut has a splined portion having a number of splines at least partially aligned with the nut axis.

3. A pin assembly as claimed in claim 2, wherein a portion of the pin where the pin recesses are located is hollow.

4. A pin assembly as claimed in claim 2, wherein the screw threaded portion of the pin is located towards a first end of the pin and wherein the pin recesses are located towards a second, opposite end of the pin.

5. A pin assembly as claimed in claim 4, wherein the screw threaded portion of the pin has a first diameter and wherein the pin recesses portion of the pin has a second diameter, the second diameter being smaller than the first diameter.

6. A pin assembly as claimed in claim 1, wherein the pin/nut recesses or sleeve recesses extend all the way through walls of the pin/nut or sleeve.

7. A pin assembly as claimed in claim 2, wherein the screw threaded portion of the nut is located towards a first end of the nut and wherein the splined portion is located towards a second, opposite end of the nut.

8. A pin assembly as claimed in claim 7, wherein the nut splines are arranged such that the ends of the splines facing the second end are exposed.

9. A pin assembly as claimed in claim 1, wherein the splined portion of the sleeve is located towards a first end of the sleeve and wherein the sleeve recesses are located towards a second, opposite end of the sleeve.

10. A pin assembly as claimed in claim 9, wherein the sleeve splines are arranged such that the ends of the splines facing the first end are exposed.

11. A pin assembly as claimed in claim 1, wherein the number of pin/nut recesses is the same as the number of sleeve recesses.

12. A pin assembly as claimed in claim 11, wherein the pin/nut recesses or sleeve recesses are arranged equiangularly about the axis of the pin/nut or sleeve.

13. A pin assembly as claimed in claim 12, wherein the number of pin/nut and sleeve recesses is an even number, such that each pin/nut or sleeve recess has a corresponding paired recess on the opposite side of the pin/nut or sleeve.

14. A pin assembly as claimed in claim 1, wherein the nut/pin splines or sleeve splines are arranged equiangularly about the axis of the nut/pin or sleeve.

15. A pin assembly as claimed in claim 1, wherein the sleeve splines are arranged such that the ends of the splines facing the first end are exposed, where the splined portion of the sleeve is located towards a first end of the sleeve and wherein the sleeve recesses are located towards a second, opposite end of the sleeve.

16. A pin assembly as claimed in claim 1, wherein the number of splines and the number of recesses have no common factors greater than 2.

17. A pin assembly as claimed in claim 16, wherein the number of splines and the number of recesses have no common factors other than 1.

18. A landing gear actuation mechanism comprising the pin assembly of claim 1.

19. An aircraft comprising the pin assembly of claim 1.

20. A method of assembling the pin assembly of claim 1.

21. A method of assembling the pin assembly as claimed in claim 20, comprising the steps of:
    mating the screw threaded portion of the nut to the screw threaded portion of the pin and tightening to a desired torque,
    mating the splines of the sleeve to the splines of the nut/pin, such that one of the sleeve recesses aligns with one of the pin/nut recesses as closely as possible, and inserting the cross-member through the chosen pin/nut and sleeve recesses.

22. A method of assembling the pin assembly as claimed in claim 21, wherein the step of mating the splines of the sleeve to the splines of the nut/pin comprises judging the best orientation of the sleeve relative to the nut/pin to minimise misalignment between any one of the pin/nut recesses and any one of the sleeve recesses.

23. A method of assembling the pin assembly as claimed in claim 21, wherein the steps are carried out in the order listed.

24. A kit of parts for assembling the pin assembly or fixing assembly as claimed in claim 1, the kit of parts comprising the pin/elongate part, the nut, the sleeve, and, optionally, the cross-member.

25. A fixing assembly comprising;
an elongate part defining an axis and having a screw threaded portion,
a nut secured to the elongate part by means of a screw threaded portion of the nut mating with the screw threaded portion of the first elongate part,
and a sleeve fitted in a manner which restricts rotation of the nut relative to the elongate part, wherein the fixing assembly is so arranged that:
rotation of the sleeve relative to the elongate part is restricted by means of an interaction between one or more formations of a first type of the sleeve and one or more formations of the elongate part; and
rotation of the sleeve relative to the nut being restricted by means of an interaction between one or more formations of a second type of the sleeve and one or more formations of the nut; and
the fixing assembly is so arranged that, with the nut secured to the elongate part, the sleeve may be positioned in:
a first rotational position in which:
the formations of the sleeve of one of the first and second type are aligned with corresponding formations on the elongate part/nut, and
a first formation of the sleeve of the other of the first and second type is more closely aligned with a second corresponding formation on the elongate part/nut, than in any other rotational position, and
a second rotational position in which:
the formations of the sleeve of one of the first and second type are aligned with corresponding formations on the elongate part/nut, and
the first formation of the sleeve of the other of the first and second type is both more closely aligned with a third corresponding formation on the elongate part/nut than in any other rotational position and more closely aligned with the third corresponding formation than the alignment of the first formation with the second corresponding formation when in the first rotational position.

26. A landing gear actuation mechanism comprising the fixing assembly of claim 25.

27. An aircraft comprising the fixing assembly of claim 25.

* * * * *